United States Patent [19]
Jewell et al.

[11] Patent Number: 5,344,663
[45] Date of Patent: Sep. 6, 1994

[54] PROCESS FOR PRODUCING A FAT-SUBSTITUTE BAKERY DOUGH AND THE FAT SUBSTITUTE BAKERY PRODUCTS

[75] Inventors: Anne M. Jewell, East 3408 Garnet, Spokane, Wash. 99207; Tom Seaman, Palouse, Wash.

[73] Assignee: Anne M. Jewell, Spokane, Wash.

[21] Appl. No.: 821,735

[22] Filed: Jan. 15, 1992

[51] Int. Cl.$^5$ .............................................. A23L 1/10
[52] U.S. Cl. .................................. 426/549; 426/550; 426/804
[58] Field of Search ........................ 426/549, 550, 804

[56] References Cited

U.S. PATENT DOCUMENTS

| | | | |
|---|---|---|---|
| 1,194,455 | 8/1916 | Williams | 426/550 |
| 1,238,372 | 8/1917 | Williams | 426/550 |
| 3,089,773 | 5/1963 | Bates | 426/550 |
| 3,493,390 | 2/1970 | Succo | 426/550 |
| 3,764,344 | 10/1973 | Glabe | 426/549 |
| 4,018,898 | 4/1977 | Tollefson | 426/21 |
| 4,348,417 | 9/1982 | Greup | 426/549 |
| 4,717,570 | 1/1988 | Polizzano | 426/549 |
| 5,023,099 | 6/1991 | Boehna | 426/549 |
| 5,139,808 | 8/1992 | Barnes | 426/557 |
| 5,188,859 | 2/1993 | Lodge | 426/560 |

FOREIGN PATENT DOCUMENTS 2221374  2/1990  Spain ................................. 426/550

OTHER PUBLICATIONS

Talburt 1967 Potato Processing pp. 472–477.
Product Update-Fat Substitute Food Technology Jan. 1990 pp. 104–105.
Rudolph, Marvin J., Ph.D., et al., "Fat Replacers: U.S. Markets and Technologies," *Spectrum* Food Industry Decision Resources, Inc., Press Date: Feb. 12, 1991, 8 pp.
Jones, Sylvia A., "Approaches and Considerations in the Development of Reduced-Fat Foods," Letterhead Food Research Association, 19 pp.
Stepan PVO Department Formulation Guide, 2 pp.
Babayan, Vigen K., "Medium Chain Triglycerides and Structured Lipids," Speciality Lipids and Their Biofunctionality Symposium Held at the 76th AOCS Annual Meeting in Philadelphia, Pa., May 1985, *Lipids*, vol. 22, No. 6 (1987), pp. 417 and 419.
1988 Report from the United States Surgeon General, 16 pp.
Wong Hahn, Patricia, Ph.D., "Key Issues in the Development of Fat-Reduced Bakery Products," *Fat and Cholesterol Reduced Foods Technologies and Ingredients*, Mar. 14–16, 1991, Atlanta, Ga., 17 pp.
McGinley, E. Joseph, "Functionality of Colloidal Cellulose in Low Fat Processed Foods," 16 pp.
Mason, William R., "Systems Approach to Fat Replacement," 13 pp.
Ang, Jit F. et al., "Using Solka-Floc ® Powdered Cellulose in Baked Products," 2 pp.
Whistler, Roy L., "Applications of Starches in Foods," *Starch: Chemistry and Technology*, Academic Press, Inc., Second Edition, 1984, 7 pp.
Zobel, Henry F., "Gelatinization of Starch and Mechanical Properties of Starch Pastes," *Starch*, 2nd ed., Chapter IX, Copyright 1984 by Academic Press, Inc., 8 pp.

(List continued on next page.)

*Primary Examiner*—Carolyn Paden
*Attorney, Agent, or Firm*—Christensen, O'Connor, Johnson & Kindness

[57] ABSTRACT

A fat substitute bakery dough, comprising a wheat flour, a fat substitute comprising from greater than 8 to less than 62 percent of potato flour and from greater than 1.1 to less than 12 percent of non-fat dry milk solids, from greater than 7 to less than 60 percent of an emulsifying binder selected from the group consisting of eggs, egg components, low-fat egg substitutes and mixtures thereof, from greater than 11 to less than 93 percent of a fat-like sensory additive, selected from the group consisting of corn syrup, molasses and mixtures thereof; and a leavening agent, wherein all percents are based on the weight of wheat flour. A process for mixing the above ingredients, followed by baking to produce a moist, tender cookie is disclosed.

18 Claims, 3 Drawing Sheets

OTHER PUBLICATIONS

Young, Austin H., "Fractionation of Starch," *Starch*, 2nd ed., Chapter VIII, Copyright 1984 by Academic Press, Inc., 4 pp.

French, Dexter, "Organization of Starch Granules," *Starch*, 2nd ed., Chapter VII, Copyright 1984 by Academic Press, Inc., 2 pp.

Gracza, Rezsoe, "Minor Constituents of Starch," *Starch: Chemistry and Technology*, vol. 1, Chapter VI, Academic Press, 1965, 4 pp.

Leach, Harry W., "Gelatinization of Starch," Chapter XII, 13 pp.

Foster, Joseph F., "Physical Properties of Amylose and Amylopectin in Solution," Chapter XV, 6 pp.

Greenwood, C. T., "Starch and Glycogen," *The Carbohydrates, Chemistry and Biochemistry*, Second Edition, vol. IIB, Academic Press, 1970, 13 pp.

Badenhuizen, N. P., "Starch Granules from Various Sources" and Starches, *The Biogenesis of Starch Granules in Higher Plants*, Appleton-Century-Crofts, New York, 1969, 11 pp.

Charley, Helen, *Food Science*, The Ronald Press Company, New York, Copyright 1970, 8 pp.

Hodge, J. E., et al., "Carbohydrates," *Principles of Food Science, Part I Food Chemistry*, Chapter 3, Marcel Dekker, Inc., New York, Copyright 1976, 20 pp.

Lindsay, R. C., "Other Desirable Constituents of Food," Chapter 10, 7 pp.

Krog, N., "Function of Emulsifiers in Relation to Food Texture," *Rheology and Texture in Food Quality*, Chapter 16, The AVI Publishing Company, Inc., Westport, Ct., Copyright 1976, 22 pp.

Schwimmer, S. et al., "Structure and Chemical Composition of the Potato Tuber," Chapter 2, and Potato Starch, Chapter 15, *Potato Processing*, The AVI Publishing Company, Inc., Westport, Ct., 1959, 11 pp.

Talburt, W. F., et al., "Structure and Chemical Composition of the Potato Tuber," *Potato Processing*, Fourth Edition, An AVI Book, Published by Van Nostrand Reinhold Company, New York, Copyright 1987, 6 pp.

Willard, Miles J., "Porato Flour," *Potato Processing*, Chapter 16, 8 pp.

Willard, M. J., et al., "Potato Flour," Chapter 16, 11 pp.

Waldt, Leonard M., "Pregelatinized Starches for the Food Processor," Presented at the Nineteenth Annual Meeting of the Institute of Food Technologists, Philadelphia, May 17, 1959, 4 pp.

Slade, Louise, et al., "Protein-Water Interactions: Water as a Plasticizer of Gluten and Other Protein Polymers," *Protein Quality and the Effects of Processing*, Marcel Dekker, Inc., New York, Copyright 1989, 4 pp.

Anderson, K., "Ingredients for Reduced-Calorie Foods," *Foods for the '90s*, Elsevier Applied Science, London/New York, Copyright 1990, 13 pp.

Bakal, Abraham I., "Fat Reduction in Baked Goods," Advances in Applied Biotechnology Series, vol 12, *Fat and Cholesterol Reduced Foods: Technologies and Strategies*, Portfolio Publishing Company, The Woodlands, Texas, and Gulf Publishing Company Book Division, Houston, Texas, Copyright 1991, 8 pp.

"Show in Print Section," *Cereal Foods World*, vol. 34, No. 1, Jan. 1989, 19 pp.

"Ingredients for Low-Sodium/Low-Fat Foods," Product Update, *Food Technology*, Oct. 1991, 6 pp.

McGinley, E. Joseph, "Functionality of Colloidal Cellulose in Low Fat Processed Foods," 8 pp.

Vetter, James L., Ph.D., "Nutritionally Modified Bakery Foods, Calorie Reduced/Controlled and Fat and Cholesterol Reduction/Elimination," 9 pp.

Glicksman, Martin, "Hydrocolloids and the Search for the 'Oily Grail'," *Food Technology*, Oct. 1991, 8 pp.

Vetter, James L., Ph.D., "Nutritionally Modified Bakery Foods, Calorie Reduced/Controlled and Fat and Cholesterol Reduction/Elimination," 17 pp.

PROCESS FOR PRODUCING A FAT-SUBSTITUTE BAKERY DOUGH AND THE FAT SUBSTITUTE BAKERY PRODUCTS

FIELD OF THE INVENTION

The present invention relates to bakery doughs and processes for producing the same, more particularly to low-fat and non-fat bakery doughs, and still more particularly to bakery doughs containing potato flour as a fat substitute.

BACKGROUND OF THE INVENTION

Fat mimetics or replacements in food products are highly desirable as dietetic alternatives for reducing calories and reducing fat and cholesterol intake. However, it is often difficult to formulate food products using such fat mimetics or replacements while preserving desirable properties of the food product. For example, bakery doughs are generally an aqueous colloidal dispersion (i.e., a hydrocolloid) of hydrophilic (e.g., flour and sugar) and hydrophobic (e.g., fats and shortenings) components that become cross-linked and/or trapped in an air-filled matrix upon baking. Key features of the product that are determined by the resulting increase in volume, or swelling, during baking include at least breaking strength, crumb texture, moisture content, and mouthfeel.

Fats trap moisture, and provide a degree of smoothness and creaminess that is difficult to replace with fat substitutes. When fats are removed from a product, the moisture content of the product must usually be increased in compensation. However, a practical upper limit exists since if moisture content is raised too high, microbial growth results. In addition, fats undoubtedly contribute to the freeze-thaw stability and shelf life of bakery products. Without fats it is difficult to achieve desirable properties in bakery products, such as flavor and color, or physical properties such as texture, crumb grain, and mouthfeel.

According to Glicksman M., *Hydrocolloids and the Search For the "Oily Grail"*, Food Tech. 45(10), pp. 94–103, 1991, the mimicking of fatty or organoleptic mouthfeel and the perception of fat-like properties in a fat-free food requires a mixture of components with the following properties: body, lubricity, perceived creaminess or smoothness, absorption and adsorption effects for taste buds or tongue; and possibly cohesiveness, adhesiveness, and waxiness.

Currently available fat replacements for food products include hydrocolloids such as polysaccharide polymers that thicken or gel in aqueous solvents. Hydrocolloids provide the properties of body, viscosity or thickening, as well as emulsifying, stabilizing, encapsulating, molding, binding, and whipping properties (Clicksman, 1991). Hydrocolloid fat mimetics and fat substitutes can be classified into six general categories: starches (e.g., modified and unmodified); other carbohydrates (e.g., celluloses); protein-based (e.g., whey, gelatin); functional food additives (e.g., gums); synthetic compounds (e.g., polydextrose); and, combinations of the former.

Modified starch fat substitutes are most commonly formulated from enzyme- or acid-hydrolyzed modified dextrins of low dextrose equivalents (DE). When dispersed in a cold aqueous solution, these modified starches form gels that mimic some of the sensory characteristics of fats. N-Oil TM (National Starch & Chemical Co., Bridgewater, N.J.) is one such modified starch derived from tapioca starch, and is said to produce a soft, fat-like gel that is not gummy. Rice*Trin-3-Complete TM (Zumbro/IFP Co., Hayfield, Minn.) is another low DE hydrolyzed starch that reportedly can form a glossy and springy gel mimicking the texture of fat.

Other commercial modified starch fat substitutes include: Paselli-SA2 TM (Avebe America, Inc., Princeton, N.J.), a dextrin produced from potato starch; Purity-W TM (National Starch and Chemical Co.), a modified waxy corn starch that supposedly provides body similar to an emulsified fat; Hylon-VII TM (National Starch and Chemical Co.), a high amylose starch; Sta-Slim TM (A.E. Staley Manufacturing Co., Decature, Ill.), a modified potato starch; Stellar TM (A.E. Staley, supra), an acid-treated corn starch; Maltrin-M040 TM (Grain Processing Corp., Muscatine, Iowa), a corn dextrin; SF 01906 (Cerestar), a potato starch; and, Amalean-1 TM (American Maize-Products Co., Hammond, Ind.), a modified high amylose corn starch. In general, the properties of starch-based fat substitutes require that they be formulated into compositions with a relatively large volume of water. Thus, while starch-based fat substitutes may be suitable for certain bakery products that possess a high moisture content (e.g., cakes, and muffins with a high moisture content and small grain texture), the properties are generally not considered desirable for use in formulating lower moisture foods such as cookies and cracker products having a course crumb grain structure. Vetter, J. L., *Nutritionally Modified Bakery Foods*, Tech. Bull. American Institute of Baking, Manhattan, Kans., 1991.

Blends of components available as fat substitutes include: N-Flate TM (National Starch and Chemical Co.), a blend of nonfat milk solids, emulsifiers, modified starch, mono- and diglycerides, polyglycerol monoesters, and guar gum for cake mixes; Ultra-Freeze TM (A.E. Staley Manufacturing Co.), a blend of modified starch, vegetable protein, and corn syrup solids for low-fat frozen deserts; Nutrifat TM (Nutrifat Co., a division of Research Associates Inc., N.J.), a blend of hydrolyzed starches with or without protein and polysaccharide additives for baked goods; Pretested Colloid No Fat 102 (TIC Gums, Inc., Belcamp, Md.), a blend of gum arabic, modified food starch, and alginate for cookie fillings and icings; Dricoid 280 TM (Kelco Co., San Diego, Calif.), a blend of guar gum, mono-and diglycerides, xanthan gum, Polysorbate 80, and carrageenan gum for desserts and frozen yogurts; and, Avicel RCN 10 (FMC Corp.), a blend of cellulose gel and guar gum for frozen desserts. N-Flate TM used in cake flour at 19% by weight reportedly aids in air entrapment and promotes large cake volume and fine crumb structure. Mason, W. R., *Systems Approach to Fat Replacement*, Tech. Bull. National Starch and Chemical Co., Bridgewater, N.J., 1991.

Other carbohydrate-based fat substitutes consist of cellulosic ingredients and polydextrose. Colloidal grades of microcrystalline cellulose (Avicel) and carboxymethylcellulose (FMC Corp.) are marketed as fat substitutes. Alpha celluloses are also available (James River Corp.). When dispersed in water a cellulosic gel may be formed and these compositions are most commonly employed as bulking agents, i.e., for increasing product volume or density (gm/unit volume).

The above described conventional hydrocolloid fat substitutes have generally not been found suitable for producing non-fat or low fat baked products such as cookies, having a relative low moisture content (as compared to cakes), course crumb grain structure, and low cost.

Potato flour has conventionally been used commercially in breads, crackers, pastries, doughnuts, cakes and cake mixes to combat retrogradation. The potato flour is typically added in quantities of 2 to 3%, based on the weight of wheat flour in the dough. Water retention by the potato flour helps preserve the freshness of the finished product. The addition of potato flour at levels up to 5 % of conventional fat containing sugar cookie dough has also been suggested to enhance bloom, color, texture and flavor. Willard, M. S. et al., *Potato Flour*, Ch. 16 in Potato Processing, Fourth Edition, W. F. Talburt et al. (Ed.), p. 665, Van Nostrand Reinhold Co., DAC, New York, N.Y. (1987). However, the replacement of shortening in conventional bakery products with potato flour has not previously been recognized.

SUMMARY OF THE INVENTION

In a preferred embodiment, the fat substitute bakery dough of the present invention comprises wheat flour and potato flour substituted for at least a portion of fat ingredients, wherein the bakery dough has a total fat content of less than 15 percent, based on the weight of wheat flour.

In another aspect of the present invention, the fat substitute bakery dough of the present invention comprises wheat flour, at least 8 percent potato flour as a fat substitute, based on the weight of wheat flour, and a dough binding agent.

In a further aspect of the present invention, a fat substitute bakery dough comprises a wheat flour, a fat substitute comprising from greater than 8 to less than 62 percent of potato flour and from greater than 1.1 to less than 12 percent of non-fat dry milk solids, from greater than 7 to less than 60 percent of an emulsifying binder selected from the group consisting of eggs, egg components, low-fat egg substitutes and mixtures thereof, from greater than 11 to less than 93 percent of a fat-like sensory additive, selected from the group consisting of corn syrup, molasses and mixtures thereof; and a leavening agent, wherein all percents are based on the weight of wheat flour.

In a further aspect of the present invention, the above listed components are mixed to prepare a fat substitute bakery dough, followed by baking the dough to produce a tender, moist cookie.

The present invention provides a hydrocolloid fat substitute dough for low moisture (as compared to cakes) bakery products such as cookies and cookie-like baked products. Other aspects of the invention provide a process for mixing to form a batter that when baked will form low-fat, or non-fat, cookies that are tender, moist, and chewy with a relatively high moisture content (for cookies) and water activity value. The fat substitute dough of the present invention produces a baked product with satisfactory color (browning), flavor, and texture qualities combined with a desirable open, coarse crumb grain structure (not cake-like).

The fat substitute bakery product produced by dough formulated in accordance with the present invention has a high (for cookies) moisture content, yet does not require preservatives to avoid microbial contamination. The dough of the present invention has improved freeze-thaw and storage stability. Finally, the hydrocolloid fat substitute dough produced in accordance with the present invention utilizes a non-chemically altered fat substitute comprising naturally occurring ingredients. Thus the dough of the present invention, and baked products produced therefrom, are relatively low cost as compared, for example, to baked products produced from enzyme- or acid-modified starches as fat substitutes, or synthetic fat substitutes.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

The following terms as used herein throughout are intended to mean the following:

"Hydrocolloid fat substitute bakery dough" is used to mean a colloidal dispersion in water that contains: a particulate starchy flour, as a fat substitute; wheat flour; a water absorbing dough binder; a protein coagulant emulsifying binder; a leavening agent; and that may also contain optional additives, e.g., a flavor additive or a fat-like texturizing additive.

The hydrocolloid fat substitute bakery dough has the properties of a "cookie-like dough." "Cookie-like dough" is used to mean a hydrocolloid fat substitute bakery dough that, in contrast to other bakery dough products, requires a high viscosity or strength for packaging and freezing, and that produces a product exhibiting a desirable the desired browning, spread (i.e., diameter), crumb texture (i.e., course crumb grain with tender-chewy texture), moisture content, and absence of undesirable 'off-flavors'.

The hydrocolloid fat substitute bakery dough produces a "fat substitute" bakery product, which as used herein means a bakery product with less than 45 to 50% weight (based as a percentage of wheat flour) of fat, or lipid, e.g., mono-, di- or triglycerides such as in shortening and eggs. Preferably the bakery product produced by the present invention has less than 25 % fat, still more preferably less than 15 % fat, and most preferably less than 5 % fat.

"Cookie-like bakery product" is used to mean the bakery product of a "cookie-like" dough. "Cookie-like bakery products" as used herein means bakery products with a course crumb texture, chewy mouthfeel, and with an open, coarse crumb grain structure, such as moist cookies. Additionally, "cookie-like bakery products" is meant to include other baked products having these same characteristics, such as certain brownies, cookie bars, etc. In contrast, "cookielike bakery products" as used herein is not meant to include: products that are dry, brittle, excessively crumbly, tough, gummy, or dense products, or products that do not have a crumb grain, but are instead spongy or cake-like.

"Particulate starchy flour" as used herein means a pregelatinized flour containing a high starch content, fiber, protein and sugar. Preferably, the particulate starchy flour is "potato flour" having the properties of unhydrolyzed and otherwise unmodified pre-gelatinized potato flour, e.g. unmodified potato flour with a composition similar to that in Table 1, below, that contains fiber, protein, sugars, and ash in addition to pre-gelatinized potato starch. The term "potato flour" is not used herein to mean modified enzyme- or acid-treated pre-gelatinized potato starch, or a flour that has had the natural fiber removed during processing.

"Fiber" is used herein to mean plant cell wall components, such as potato tubor cell walls components, e.g., carbohydrates, proteins, celluloses and hemicelluloses.

"Wheat flour" is used to mean a wheat flour that is capable of forming a strong dough, a viscous batter, and bakery products that are tender (i.e., cookie-like breakability not cake-like), and moist (i.e., not gummy or dry), with a cookie-like grain texture (i.e., not a cake-like small grain texture). A preferred wheat flour is a low extraction/high ratio soft white wheat flour.

"Binder" is used to mean an agent that when baked binds the composition together in an air-filled matrix.

"Water absorbing dough binder" is used to mean a hydrophilic protein(s) that associates ionically with carbohydrates in a flour, such as but not limited to a caseinate protein, e.g., non-fat dry milk solids.

"Emulsifying binder" is used interchangeably with "protein coagulant binder" to refer to a binder that has the properties of an emulsifier-tenderizer with aeration and suspension properties. Representative examples of emulsifying binders are ovalbumins, i.e., egg proteins, and non-fat egg substitutes.

"Leavening agent" is used to mean an aerating agent, preferably baking soda or baking soda in a mixture such as a baking powder, e.g., aluminum sulfate, soda, and monocalcium phosphate.

"Additive" is used to a mean flavoring agent (e.g., brown sugar; or, powdered butter flavoring), or fat-like texturizing agent (e.g., a corn syrup or molasses). As used herein, additive is not to be interpreted according to definitions of food labeling laws.

Embodiments of the invention provide hydrocolloid fat substitute bakery dough compositions that contain primarily hydrophilic (i.e., starch and fiber) rather than hydrophobic components (i.e., lipids such as animal fats or shortenings). In a preferred embodiment the dough is a cookie-like dough. The particulate starchy flour, such as whole potato flour, is used in the present invention to replace a portion, and preferably at least 75 to 100%, and most preferably 100%, of the shortening, oil, margarine or butter that would otherwise be used in conventional bakery products. However, as discussed below some fats (i.e., lipids) may be present in the form of eggs and flavorings, such as powdered butter.

As used herein throughout, unless otherwise noted, all percentages are expressed as "bakers percentages", i.e., as a percent of the weight of wheat flour used in the bakery dough. Thus the quantity of wheat flour present in the dough provides a basis of 100%.

The hydrocolloid fat substitute bakery dough contains optimum proportions (as expressed as a percentage of the weight of wheat flour) of: from greater than 8 to less than 62 percent, and most preferably from 10 to 25 percent, of a particulate starchy flour (e.g., particulate potato flour); from greater than 1.1 to less than 12 percent, and most preferably from 4 to 8 percent, of a water absorbing dough binder (e.g., non-fat dry milk); from greater than 7 to less than 60 percent, and most preferably from 20 to 40 percent, of an emulsifying binder (e.g., a protein coagulant such as egg or egg substitute); from greater than 0.5 to less than 5 percent, and most preferably from 1 to 3 percent, of a leavening agent (e.g., soda and baking powder); and from greater than 7 to less than 28 percent, and most preferably from 10 to 20 percent, of a liquid, such as water or milk (preferably 0 to 2 percent milk fat).

The hydrocolloid cookie-like dough may optionally contain additives such as flavoring additives (e.g., greater than 21 to less than 139 percent, and most preferably from 70 to 90 percent, of brown sugar; greater than 1.5 to less than 6 percent of butter flavoring; greater than 1 to less than 20 percent of butter powder; or, greater than 0.25 to less than 2.0 percent of vinegar; or, vanilla to taste); or, it may contain a fat-like texturizing and/or bulking additive, (e.g., greater than 11 to less than 93 percent, and most preferably from 20 to 40 percent, of a corn syrup, or an equivalent weight of a mixture of corn syrup and molasses, wherein the molasses comprises no more than one half of the mixture).

The bakery dough composition has a moderately high water-holding capacity but low dough strength, and produces an appropriate cookie-like bakery product texture, crumb grain, and mouthfeel. In a preferred embodiment the compositions of the invention provide a hydrocolloidal fat substitute bakery dough that is a blend of constituents that produces a tender, moist, and chewy bakery product, such as a cookie. Cookie-like products, such as certain brownies and cookie-bars, may also be produced.

Cookies produced in accordance with the present invention have a relatively high moisture content (for a cookie) of from 5 to 15 %, based on the total weight of the cookie after baking, and preferably from 8 to 12%, and most preferably about 10%. Further, cookies produced in accordance with the present invention have been found to have a free water activity level of from 0.4 to 0.7, and preferably about 0.55, thereby retarding microbial growth.

Despite the relatively high moisture content of the product produced from the fat-substitute bakery dough of the present invention, the product does not require addition of a preservative to avoid microbial contamination. This is due to the complexing of water by hydration within the matrix of the bakery product as described more fully below. As used herein the "high moisture" (about 5 to 15% of the weight of the baked product) product produced is to be understood as having a high moisture content relative to other types of cookies, such as "short-bread" cookies, but as having a low moisture content relative to cakes and the like.

Embodiments of the invention provide satisfactory cookie-like color (browning), flavor, and texture qualities that are combined with a desirable open, coarse crumb grain structure (not cake-like). The embodiments of the invention are not intended to produce 'short' low moisture bakery products, i.e., products that are tender/crisp-brittle, tender/dry-crumbly, or hard/-crunchy-brittle.

a. Potato Flour as a Fat Substitute

Preferred embodiments of the invention utilize a particulate starchy flour, such as potato flour, with properties desirable for formulating a hydrocolloid fat-substitute bakery dough that is low-fat or non-fat. Potato flour is a preferred multi-component fat substitute determined to be properly suited for a cookie-type dough because it combines several required physical and sensory properties that fats would normally contribute to a cookie-like bakery product: namely, texture stabilizing properties, moisture, and tenderness. The potato flour useful in the embodiments of the invention is water-dispersible and forms a gel (with time) in cold water. The potato flour gel has the body, viscosity, and creaminess required for a fat-like mouthfeel.

Potato flour, as is useful in practice of the present invention, is commonly available either processed from steam-cooked potatoes (without peel), which are flattened into thin sheets, dried, milled and screened into flour, or alternatively spray dried into flour. One suitable potato flour is commercially available from Guistos Vita Grain, Co., San Francisco, Calif..

Potato flours as used in the present invention are to be distinguished from pre-gelatinized or enzyme/acid modified water soluble potato starches, such as commercially available under the trade name Pennplus UM TM from Pennford Products. The present invention provides the advantage of a potentially less expensive 'potato flour' fat substitute than more expensive 'enzyme- or acid-modified starches.' In addition, potato flour has superior properties for use as a fat substitute for producing bakery products, as described below. The potato flours useful in the embodiments of the invention contain potato plant cell wall components (fiber), water soluble proteins, simple sugars, and/or ash (minerals such as potassium) many of which components are not commonly present in pre-gelatinized potato starches.

Table 1 provides a representative illustrative example of the percentage dry matter composition of a whole 'potato flour' (such as may be useful in the embodiments of the invention), as contrasted with the composition of a 'modified pre-gelatinized potato starch'. Treadway, R. H., Potato Starch, Ch. 15 in Potato Processing, W. F. Talburt et al. (Ed.), p. 374, AVI Publ. Co. Westport, Conn., 1959; Willard, M. J., Potato Flour, Ch. 16 in Potato Processing, W. F. Talburt et al. (Ed.), p. 390, AVI Publ. Co., Westport, Conn., 1959.

TABLE 1

| Percentage Composition by Weight of Potato Products | | |
|---|---|---|
| | Potato Starch | Potato Flour |
| Starch | 98% | 68% |
| Protein | 0.1% | 11% |
| Sugars | 0.1% | 3% |
| Fiber | 0.5% | 8% |
| Ash | 0.3% | 5% |

Embodiments of the invention provide a hydrocolloid fat substitute bakery dough formulated with a potato flour gel (i.e., rather than a pre-gelatinized potato starch gel). For example, a cold water gel of powdered 'pre-gelatinized potato starch' (e.g., Pennplus Um TM) has the undesirable properties of a much higher water absorbing capacity, and is more viscous, cohesive, gummy and slippery in mouthfeel than the corresponding amount of a desirable 'potato flour' which is by comparison a creamy and soft cold water gel.

Embodiments of the invention provide hydrocolloid fat substitute bakery doughs formulated with potato flour, with starch being one component of the potato flour. The starch characteristics in the potato flour are important for dough mixing quality, stability, and texture of both the bakery product, e.g., a cookie, and the dough. Common methods for processing potato flour include high temperature and moisture treatment which result in gelatinization of the starch. Pre-gelatinization irreversibly alters the granular structure of the native starch and produces a water-dispersible gel (Charley, H., Food Science, 1970). Thus, the potato starch that is present in a potato flour has been pre-gelatinized. The potato flours useful in the embodiments of the invention have the desirable qualities of gelatinization and hot paste swelling that are similar to those of other cereal starches that have a higher amylose content (Hodge, J. E. et al., Carbohydrates, Ch. 3 in Principles of Food Science, Part I: Food Chemistry, V. R. Fennena et al. (Ed.), p. 41, Marcel Dekker Inc., New York, N.Y., 1976).

Illustrative advantageous properties of the starch component of the potato flour useful in the embodiments of the invention will next be discussed. Theory as to the beneficial properties of potato flower is provided to aid understanding of the present invention, but not to limit the present invention. Pre-gelatinized potato starch in a potato flour swells in cold water to produce a gel with a higher degree of viscosity per unit of dry weight than pre-gelatinized corn or tapioca starches. Waldt, L. M., Pregelatinized Starches For the Food Processor, Food Technol. 14(1), pp. 50–53, 1960; Inman, J. Pennford Products Co., Richland, Wash., 1991. Less pre-gelatinized potato starch is therefore required to produce hydrocolloid gels (i.e., water containing gels) of an equal consistency or viscosity to higher concentrations of other plant starches.

Potato starch contains a lower percentage of amylose than cereal starches such as corn (non-waxy), wheat, rice or barley. Schwimmer, S. et al., Structure and Chemical Composition of the Potato Tuber, Ch. 2 in Potato Processing, W. F. Talburt et al. (Ed.), p. 12 AVI Publ. Co., Westport, Conn.; 1959; Greenwood, C. T., Starch and Glycogen, Ch. 38 in The Carbohydrates-Chemistry and Biochemistry, Second Edition, W. Pigman et al. (Ed.), p. 471, Academic Press, New York, N.Y., 1970.

Unlike other (unmodified) starches, potato starch is characterized by the presence of a high content of phosphorus esterified to the amylopectin fraction (Gracza, R., Minor Constituents of Starch, Ch. 6, in Starch: Chemistry and Technology, Vol. 1, R. L. Whistler et al. (Ed.), p. 105, Academic Press, New York, N.Y., 1965; Greenwood, 1970). While not wishing to be limited by theory, it has been proposed that during gelatinization of potato starch, the presence of bound anionic phosphate esters may inhibit self-association of amylopectin molecules by coulombic (negative-negative) charge repulsion, thereby possibly allowing increased access of the potato starch granules to water. Leach, H. W., *Gelatinization of Starch*, Ch. 12 in Starch: Chemistry and Technology, Vol. 1, Whistler, et al. (Ed.), p. 289, Academic Press, New York, N.Y., 1965; Kruger, L. H. et al., *Starch Texture*, Ch. 12 in Rheology and Texture in Food Quality, S. J. deMar et al. (Ed.), p. 247, AVI Publ. Co., Westport, Conn., 1976. The formation of phosphate esters by starches during cooking has also been hypothesized to accelerate the rate and extent of gelatinization (Charley, 1970).

Those skilled in the art will therefore recognize that the phosphate content of a potato flour (and/or the extent of phosphate esters in the flour after milling), may influence its suitability for use in the embodiments of the invention, and that aqueous cold gelling solutions containing phosphate may be useful for modifying (i.e., increasing or decreasing) gelatinization of potato starch in a potato flour. In the latter case, modified gelatinization of a potato flour may be measured for example in a cold water potato flour gel, by measuring changes in viscosity, water retention, or resistance to syneresis or retrogradation. The pH of the solvent also influences gelation and those skilled in the art will recognize that is desirable to maintain the pH in the range of pH 6-8 and most preferably in the range of pH 7-8.

Tight-intermolecular associations of linear amylose chains in potato starches, as contrasted with loose-association of branched amylose chains in other amylopectins, are thought to restrict water flow into and out-of (i.e., syneresis) of potato starch gels. (Kruger, 1976). Potato starch also reportedly begins to gelatinize at a lower temperature and produces higher hot paste viscosity and swelling than other unmodified starches. (Leach, 1965). Potato starch produces a gelatinized hot paste viscosity reported to be approximately equal to that of a wheat starch, but at one-third the concentration of a wheat starch.

Other factors that may contribute to a high swelling capacity of potato starch granules include a low content of bound protein and fat, high hygroscopicity, density, and birefringence (Leach, 1965; Badenhuizen, N. P., The *Biogenesis of Starch Granules in Hugher Plants*, Appleton-Century-Crofts, New York, N.Y., 1969), and the large size of the starch granule (Greenwood, 1970; Charley, 1970). As a heated potato starch paste cools (unlike other cereal starches having higher amylose content), it will not set a gel, or will set only a weak gel that is not firm or tough. (Hodge et al., 1976).

In contrast, gelatinized cereal starches (e.g., corn or rice; with higher amylose contents) have the undesirable property of setting as rigid gels upon cooling, presumptively because of intermolecular associations of amylose-amylose and amylose-amylopectin to form complexes (Kruger et al., 1976). Gelatinized high amylose gels are also more prone to exhibit the undesirable properties of retrogradation (i.e., molecular reassociation between amylo- chains in a gel with time) and syneresis (i.e., expulsion of water from a gel). It is postulated that the amylose molecules reassociate following cooking so that a crystalline network is established that expels water and other materials to the surface of the product (Kruger et al., 1976). This is undesirable for embodiments of the invention because it leads to a distasteful level of surface moisture and stickiness in cookies, as well as to instability of the cookies or doughs on freezing and thawing.

Emulsifiers such as sodium stearoyl lactylate have been designed in an attempt to overcome undesirable syneresis properties of high amylose gels by binding to amylose chains and inhibiting amylose chain association (Krog, N., *Function of Emulsifiers In Relation to Food Texture*, Ch. 16 in Rheology and Texture in Food Quality, J. M. deMan et al. (Ed.), p. 507, AVI Publ. Co., Westport Conn., 1976). The relatively large molecular weight of potato amylose (Greenwood, 1970) may also hinder molecular reassociation in retrogradation. For example, low molecular weight corn amylose retrogrades much faster under the same conditions than does high molecular weight potato amylose. Foster, J. F., *Physical Properties of Amylose and Amylopectin in Solution*, Ch. 15 in Starch: Chemistry and Technology, Vol. 1, R. L. Whistler et al;. (Ed.), p. 349, Academic Press, New York, N.Y. 1965.

The inventors believe that the above surmised properties of potato starch contribute to the desirable properties of potato flour as a fat substitute in the embodiments of the invention. Further, the above properties of potato starch in potato flour are believed to serve as useful and instructive examples of the properties of flours in general (i.e., other than potato flour), that will be useful in the embodiments of the invention.

Other desirable properties of potato flours, which serve as useful and instructive examples, include a relatively large size starch particle, as well as the presence in potato flours of fiber, protein, and minerals as water-absorbing constituents. The inventors believe that these latter water-absorbing constituents play a critical role in the embodiments of the invention by allowing the potato flour to function as a fat substitute with a reduced cohesiveness (i.e., strength) of the starch gel formed by the potato flour.

However, the inventors also believe that starch gelatinization qualities, per se, do not necessarily play the only role in determining the quality of cookie-like bakery products because products with satisfactory properties of texture, moisture and flavor may still be produced in situations where starch gelatinization is not optimum: namely, e.g., in low-water content cookie-like doughs, or in cookie-like doughs with a high concentration of a sugar additive. Slade et al., *Protein-Water Interactions: Water as a Plasticizer of Gluten and other Protein Polymers*, Ch. 2 in Protein Quality and the Effects of Processing, R. D. Phillips et al. (Ed.), p. 9, Marcel Dekker, Inc., New York, N.Y. 1991.

The inventors have also shown that the fiber (e.g., celluloses and hemicelluloses) in potato flour contributes to the structural integrity of the starchy gel (see below, and Example 1). Thus, while theoretical considerations based on starch gelatinization may be useful in selecting a range of possible flours for testing, those skilled in the art will recognize that it is still necessary to conduct testing (e.g., for taste, texture, and flavor and the other cookie-like properties identified above) to select the most useful potato-like flours useful in the embodiments of the invention.

The preferred hydrocolloid fat substitute bakery doughs of the present invention formulated with potato flour contain fiber, i.e., plant cell wall materials. The cell wall materials provide characteristics important for the grainy cookie-like dough quality of the embodiments of the invention. Potato flour particulates contribute a grainy texture to the potato flour gel, and to its lack of lubricity or slipperiness. While the latter grainy properties of potato flours are generally considered undesirable in smooth-textured desserts, dressings, and puddings, and the like, they are desirable properties for the fat substitute cookie-like doughs of the invention. Such properties of graininess are not provided by pre-gelatinized or modified starches that do not contain fiber.

The presence of fiber as soluble and insoluble cell wall fibers, i.e., primarily cellulose, and small concentrations of hemicellulose and pectin, and soluble gums (Schwimmer et al.; Talburt et al., *Structure and Chemical Composition of the Potato Tuber*, Ch. 2 in Potato Processing, Fourth Edition, W. F. Talburt et al. (Ed.), p. 11, Van Nostrand Reinhold Co., Inc. New York, N.Y. 1987), contribute several advantageous properties to the hydrocolloid fat substitute gels of the invention. Specifically, the fiber provides for bulking (e.g., thickness, body, and viscosity), high water absorption, increased dough aeration, and relative stabilization of the gel from syneresis and retrogradation even on freeze-thawing and storage at room temperature. Thus fat-substitute bakery doughs produced in accordance with the present invention may be frozen for storage and shipment, followed by thawing for baking. The importance of fiber in the potato flour gel is illustrated in Example 1, below.

The inventors also believe that within the hydrocolloid fat substitute gels of the invention there may be competition for available waters of hydration, i.e., between the fat substitute (e.g. potato flour), sugar and wheat flour components, and to a lesser degree, between the nonfat dry milk solids and bicarbonate. Fiber in the hydrated particulate starchy flour is thought by the inventors to promote formation of potato-and wheat-flour-protein fibril interactions (e.g., by hydrogen and ionic bonding between the potato flour starch and the cell wall constituents). These latter protein interactions may reduce the requirements of the particulate starch for waters of hydration.

Bulking properties contributed by the fiber in the particular starchy flour are also highly desirable in the preferred embodiments of the invention. 'Instantized' pre-gelatinized starches that are not particulate starches are rapidly dispersed in cold water, but because they lack fiber they do not function effectively as bulking agents to give the appropriate gel viscosity, body, and stability for a hydrocolloid fat substitute bakery dough. Cookie-like bakery products, unlike other dough products, require a high viscosity or strength for packaging and freezing, and the dough must also produce the desired browning, spread (i.e., diameter), crumb texture (i.e., grainy and tender, not crunchy), moisture content, and absence of undesirable 'off-flavors'.

Embodiments of the invention provide improved water absorption and swelling properties that are due to attributes of potato flour. These water absorption and swelling properties provide faster development of a stable cookie-like dough with less mixing and batter preparation. Particulate starchy flours such as potato flour form cold water gels that allow mixing and batter preparation within approximately 1.5 to 20 minutes contrasted with, modified starch gels (e.g., Paselli SA2 TM), or 'minute' precooked tapioca starch that require extended periods of time (e.g., 1–2 hours) to set the gel. Comparisons of other doughs, with an illustrative example of an embodiment of a potato flour dough formulation of the present invention, are illustrated in Example 2, below.

b. Other Components of Preferred Fat Substitute Bakery Dough Formulations

Preferred embodiments of the invention provide hydrocolloid fat substitute bakery doughs that are formulated with wheat flour. Dough strength is an important factor in a fat substitute cookie-like bakery dough that lacks all or substantially all lard, shortening, or butter, such as preferred embodiments of doughs produced in accordance with the present invention. The latter fats are normally added to a conventional, 'fatty' cookie dough to coat the flour particles and block hydration of the lipid-protein-pentosan (gluten) network that forms the matrix for the bakery product. In the embodiments of the invention small differences in wheat flour particle size, water absorption, wheat starch damage, pentosan and protein content, or ash level (i.e., from the wheat grain extraction process), all have an effect on the quality of the hydrocolloid fat substitute bakery dough.

Types of wheat flours that are less suitable for use in the present invention will be obvious to those skilled in the art because of the reduced viscosity of the dough formulated with it, or because of the grain texture of crumbs produced upon breaking the resulting baked products. Those skilled in the art will recognize that adjustments in formulation will be required to optimize the hydrocolloid fat substitute dough of the invention to compensate for variations in different batches of wheat flour.

If the wheat flour is intrinsically too weak (e.g., the milling has destroyed the properties necessary for effective use in the embodiments of the invention) the dough viscosity will be too thin to package and freeze, and when baked, e.g., as cookies, the product will develop excessive spread (i.e., diameter) and browning, and the product will be thin and tough. One wheat flour found suitable by the inventors is standard pastry flour, such as is available from Pendleton Flour Mills, Pendleton Oreg. However, pastry flour is not the most preferred, due to the higher gluten content. The higher gluten content results in less spread of the cookie product, requiring the addition of a larger quantity of leavening agent, and thus a potential off flavor. A representative example of a more preferred wheat flour is a low extraction, short patent cake cut flour (approximately 50–55% extraction) milled from soft white wheat with 7.0–8.0% flour protein and less than 0.4% ash. Illustrative examples of advantageous properties of wheat flours useful in the embodiments of the invention are provided in Examples 3 and 4, below.

Other embodiments of the invention provide hydrocolloid fat substitute bakery doughs formulated with a 'water absorbing dough binder'. The water absorbing dough binder is thought by the inventors to fulfill a function of controlling moisture content in the fat substitute bakery dough by associating ionically with carbohydrate molecules in the potato and wheat flour and reducing the requirement of these molecules for waters of hydralion. The water absorbing dough binder thus is believed to exhibit a beneficial synergism or interaction with the potato flour.

A representative example of one such dough binder is provided by nonfat dry caseinated milk solids (NFDMS). It is necessary that the level of the NFDMS in the hydrocolloid fat substitute dough be adjusted relative to the level of the potato flour (PF) in the fat substitute dough. A weight/weight ratio of PF/NFDMS that is too low will produce a bakery product that is dry, e.g., tough cookies; a ratio of PF/NFDMS that is too high will produce a gummy, dense product, e.g., cookies without the desired course crumb texture; and, an optimal PF/NFDMS ratio product will be tender, moist, and chewy and have the desired open, coarse cookie-like crumb grain structure (not cake-like).

A preferred range of the weight ratio of PF/NFDMS is from about 0.875 to 41.3, more preferably from 1.0 to 10.0, still more preferably from 2.0 to 5.0, and most preferably about 3.2. Because of the importance of the PF/NFDMS ratio, potato flour and non-fat dry milk solids may be blended together in the proper ratio for use as a fat substitute mixture in preparing bakery doughs in accordance with the present invention.

Still other embodiments of the invention provide hydrocolloid fat substitute bakery doughs formulated with a protein-coagulant binder having the properties of an emulsifier-tenderizer, with additional aeration and suspension properties. One representative example of such a binder is provided by ovalbumin protein coagulants (i.e., egg proteins that form cross-linked gels when heated, e.g., obtained from whole eggs or purified egg proteins). In a preferred embodiment whole eggs were added to the hydrocolloid fat substitute cookie dough. Alternately, egg components, i.e. yolks or whites may be used. Additionally, nonfat protein coagulants, such as low-fat Egg Beaters TM frozen egg substitute (i.e., 99% fat free egg white), are suitable for use as an alternative.

A hydrocolloid bakery dough formulated in accordance with the present invention using defatted-protein coagulant contains less than 1.0 percent fat, based on the weight of wheat flour. However, it will be recognized by those skilled in the art that defatting the protein coagulant causes the hydrocolloid fat substitute dough to lose some of its fat-like properties, and the bakery products produced are less tender (i.e., breakable) and have less fat-like mouthfeel than those prepared with protein coagulants that contain some small amount of fat. For example, while Egg Beaters TM produced acceptable cookies, whole fresh eggs provided cookies that were more tender and with a more desirable fat-like mouthfeel.

The amount of the protein coagulant is determined empirically. An excessive amount of protein coagulant, e.g. egg, will result in a product with less spread on baking (swelling diameter, e.g., cookie diameter), and the crumb grain will be too cake-like. A suboptimal amount of the protein coagulant, e.g., egg, will produce a hard tough bakery product. Whole egg as a protein coagulant is preferably used in quantities of greater than 7 to less than 60 percent, based on the weight of wheat flour. This corresponds to a fat content for the dough of from greater than 1.2 to less than 10.2% fat, based on the weight of the flour. If powdered butter is added to the dough, as discussed below, the dough still contains only from greater than 2.2 to less than 14.3% fat. For the preferred egg concentration of 29% egg, the fat content of the dough is less than about 5%; if powdered butter is added, the fat content of the dough is less than about 7 %.

Preferred embodiments of the invention provide hydrocolloid fat substitute bakery doughs formulated with a leavening agent that is a baking soda (sodium bicarbonate, hereinafter referred to simply as 'soda'), e.g., baking soda, baking powder or a mixture of baking powder and soda. The leavening agent has a profound effect on the viscosity of the fat substitute doughs and their shelf life and freeze-thaw stability, as well as, on the properties of the baked product which they produce, i.e., leavening agent effects the spread, color, texture, and crumb grain of the bakery product.

A preferred embodiment has a leavening agent that is a mixture of soda with baking powder (i.e., aluminum sulfate, soda, monocalcium phosphate) in about equal amounts (i.e., 1:1 w/w). Those skilled in the art will recognize that the potency of soda and baking powder preparations is dependent upon factors such as shelf-time, level of hydration, and the like, and that some adjustments may be required to compensate for inactivation of the products during storage. An amount or activity of soda that is too low will result in baking products, e.g. cookies, that spread poorly and do not have a desirable coarse crumb structure.

An example of a widely used leaven that has less desirable properties when used in the hydrocolloid fat substitute bakery dough of the invention is provided by a mixture of ammonium bicarbonate and ammonium carbonate. While this ammonium bicarbonate mixture is a most effective leaven, it leaves a residual taste and odor of ammonia in the relatively moist bakery products of the invention.

To prevent impartation of a cake-like crumb grain, or a gummy interior, to the fat substitute bakery products of the invention, it may be necessary to bake out the excess moisture in the dough. An optimal amount of soda, (i.e., in the leavening agent, above), must be present to allow sufficient bakery product, e.g., cookie, to spread and the bakery product must brown and develop a surface crust during baking so that moisture is trapped. A proper amount of leavening agent will allow development of the desired open, coarse crumb texture at the interior of a the bakery products of the invention, and will also ensure that the bakery products have the proper moisture content. If the surface of the bakery product does not brown properly, (i.e., when an improper amount of soda is used), it will either have a dry mouthfeel, or it may develop excessive stickiness over time while in storage.

In preferred embodiments of the invention, 'additives' are provided for enhancing flavor, and for imparting a fat-like moist mouthfeel to the fat substitute bakery products of the invention. Properties of flavor enhancing 'additives' will be discussed first, followed by properties of fat-like moisturizing additives.

Many of the chemicals which are responsible for distinctive flavors in food are lipophilic compounds such as solubilized or dissolved fats and oils. Traditional 'fatty' bakery doughs contain shortenings (e.g., lard) that may help to mask or inhibit potentially unappetizing flavors. Ill the hydrocolloid fat substitute bakery doughs of the invention, any undesirable flavors (i.e., such as grainy, nutty, or rancid flavors) may potentially be enhanced (i.e., in certain batches of wheat or potato flour), requiring that the fat substitute dough contain one or more optional flavor enhancing 'additives'. For example, the milling process for wheat grain leaves different levels of the outer layers of the grain (including the germ) in different batches of the flour, and these have a significant effect on the flavor of the hydrocolloid fat substitute dough.

In a preferred embodiment of the invention the effects of the undesirable flavors is compensated for by adding an amount of a flavor enhancing 'additive', e.g., a brown sugar; or, a powdered butter (e.g., 69% fat, Commercial Creamery Co., Spokane, Wash.) or artificial butter flavoring and the like, in an amount sufficient to mask the undesirable flavor.

Brown sugar is particularly preferred because it imparts a tender texture, (i.e., easily breakable without brittleness). Brown sugar is a more satisfactory flavor than white sugar (sucrose or fructose), and textrose (e.g., glucose, corn sugar) is undesirable because it drastically reduces spread, surface browning, and moistness in the bakery product.

A powdered butter additive helps eliminate any residual potato flavor in the fat substitute bakery products, and also imparts a degree of creaminess, smoothness, lubricity, and lingering adsorption to the tongue and taste buds that gives a fat-like mouthfeel. During mixing the brown sugar additive is mixed with the potato flour (i.e., before adding water) in order to prevent lumping or caking.

Bakery doughs prepared with lard or shortening fats have "fatty" properties such as texture, and a smooth fat-like and moist mouthfeel, that are difficult to mimic in the fat substitute baking dough or product. In preferred embodiments of the invention the moist mouthfeel of fats are mimicked with optional "texturizing additives", such as but not limited to corn syrups or molasses. Corn syrups provide a soluble bulking effect that is satisfactory for achieving a fat-like mouthfeel. Substitution of unsulphured molasses (a common flavoring and bulking agent in bakery doughs) for up to one half of the corn syrup is also suitable.

An undesirable fat-like moisturizing agent is provided by Emplex TM (sodium stearoyl lactylate emulsifier) which, when added to the hydrocolloid fat substitute dough reduces the stickiness of the bakery product (i.e., presumably by inhibiting amylose retrogradation), but does not prevent moisture migration in the fat substitute bakery products during storage. Emplex TM also tends to make bakery products with a very dry mouthfeel.

Other moisturizing agents include various acid sources (e.g., lemon juice, vinegar, honey) which maintain a steady level of soda in the leavening agent in the dough, but can also lead to a baked product that has reduced spread, coarse grain, and a dry, more cake-like, texture and crumb. Thus, the addition of any such acid source as either a flavor additive, or texturizing additive, should be carefully investigated for the particular flour and optimized for the particular composition of use.

The amounts of the respective components in a representative illustrative formulation of a hydrocolloid fat substitute dough according to the invention is provided in Example 3 and Table 2 below. The example provides a formulation that produces acceptable, moist cookies commonly referred to as "snickerdoodle cookies". It should be apparent that other flavor additives can be added, such as cinnamon, or lemon juice concentrate to produce a lemon cookie. The values appearing in Table 2 are useful starting points for formulating a hydrocolloid fat substitute bakery dough according to the embodiments of the invention. Those skilled in the art will recognize that certain modifications may be required to compensate for variations in milling of different batches of flour, and for use of different water absorbing dough binders, emulsifying binders, and leavening agents.

The amount of potato flour and wheat flour useful in the embodiments of the invention may be determined empirically starting with the ranges of concentrations illustrated in the Example 3, below. It should be apparent to those of skill in the art that the addition of other moisture absorbing ingredients to the dough of the present invention will require a corresponding decrease in the amount of wheat flour used, as well as other adjustments is ingredients. For example, the addition of a whole rolled grain, such as oatmeal, would require a substantially proportional decrease in the amount of wheat flour used. In such cases the preferred weight percent rages of potato flour noted herein would be maintained, but would be computed based on the combined weight of wheat flour and oatmeal.

To prepare the fat substitute bakery dough of the present invention, the wheat flour, potato flour and dry flavor additives, such as brown sugar, are first mixed together and set aside. As the dough of the present invention is highly buffered, the water absorbing binder, e.g. non-fat dry milk solids, and leavening agent, e.g. baking soda, are preferably dissolved in a liquid, such as water or nonfat or low fat milk. The protein coagulant binder, e.g. egg, is then beaten together with any acid additives, such as vinegar, so as to enhance the formation of stable air cells in the finished product. The mixture of liquid, non-fat dry milk solids and leavening agent is then beaten into the egg mixture. Remaining liquid ingredients, such as a fat-like additive, e.g. corn syrup or molasses, are then blended into the egg mixture. The dry mixture of wheat flour, potato flour and brown sugar is then blended into the liquid mixture, followed by the addition of the remaining ingredients, such as other flavor additives.

Next, this mixture is then mixed for about 1.5 to about 20 minutes to form a dough that has optimal viscosity properties. The resulting fat substitute bakery dough is then ready for baking, or freeze storing, as discussed below.

The fresh or thawed dough is then baked to prepare bakery products, preferably at a temperature of 375 to 400 degrees Fahrenheit. The product is baked till a uniform, brown crust is formed. To prevent a cake-like crumb grain, or a gummy interior to the baked product, it may be necessary to further bake the product for a sufficient time to drive out excess moisture in the dough, as discussed above. Thus baking at the above noted temperature should continue for a period of time sufficient to produce a product having a brown crust, a moist/tender, non-gummy or excessively dry interior with a coarse crumb-grain structure, as will be readily determined by those of ordinary skill in the art.

After baking, and upon standing out of the oven for 1–2 hours, the bakery products of the invention remain relatively crisp and tender. However, upon prolonged standing at room temperature unsealed (i.e., for more than 5 hours), the bakery products begin to harden and dry out. In a preferred embodiment the bakery products are sealed in a suitable container, e.g., a shrink wrap or foil-lined plastic wrapper or container, within about one hour after baking. When sealed in this manner at room temperature for 24 hours the fat substitute bakery product becomes equilibrated for syneresis (moisture migration), remains tender, moist, and chewy, and does not develop surface stickiness or interior gumminess as long as it is sufficiently browned.

A second stage retrogradation of the fat substitute bakery products of the invention begins after approximately 10 days storage at room temperature, and the cookies have increased hardness thereafter.

In a preferred embodiment of the invention a hydrocolloid fat substitute bakery dough is provided that has reduced syneresis and retrogradation, and with improved freeze-thaw and storage stability. In a most preferreel embodiment the hydrocolloid fat substitute bakery dough is a cookie dough. Those skilled in the art will recognize that syneresis in certain starches can lead to freeze-thaw instability, and that introduction of monoesterified phosphate groups into the particulate starchy flour by chemical modification is one method for improving freeze-thaw stability (Hodge et al., 1976). In a preferred embodiment of the invention the presence of natural phosphate esters in the amylopectin fraction of potato starch provides a level of advantageous freeze-thaw stability to the embodiments of the invention by prolonging or retarding the onset of amylopectin retrogradation.

EXAMPLE 1

Demonstration of the Importance of Fiber in the Particulate Starchy Flour

The importance of fiber, e.g., celluloses and hemicelluloses, in potato flour was demonstrated by treating a starchy gel prepared from potato flour swollen with water with a purified cellulase enzyme that hydrolyzes $\beta 1,4$ anomeric linkages in cellulose and hemicellulose polysaccharides. After 1 hour incubation at room temperature the potato flour gel began to 'weep', releasing water and losing its structure. After overnight incubation the potato flour gel had liquified to a cloudy solution of suspended starch granules that had no apparent structural (i.e., gel) integrity. Untreated potato flour control gels remained intact, swollen (but somewhat dry) after a similar overnight incubation, and then did not 'weep' or lose water.

That potato flour starchy gels are believed to be relatively unique in this structural participation of celluloses and hemicelluloses, as was shown by treating a tapioca starch gel (i.e., instant pudding) in a similar manner with the cellulase. In this case, the tapioca gel did not lose its structural integrity, even after overnight incubation, although both the treated and untreated tapioca gels lost a small volume of water due to 'weeping' during the incubation.

The results indicate that the presence of cell wall materials in the potato flour may help to control and/or stabilize syneresis and retrogradation of starchy potato flour gels, and confers desirable properties to food products formulated with these fat substitutes in accordance with the present invention.

EXAMPLE 2

Investigation of Different Particulate Starchy Flour Fat Substitutes

Comparisons of the doughs and coo-Ides prepared with various unmodified starches as fat substitutes were conducted by adding 40–50% w/w of the fat substitute to a wheat flour (e.g., 40–50 gm of potato flour per 100 gm of wheat flour). The resulting formulations were subsequently mixed with water into doughs and baked. Uncooked (not pre-gelatinized) rice and barley flours produced coarse, dry, crumbly (unstructured) chocolate chip cookies. Uncooked high amylose and waxy (100% amylopectin corn flours, and uncooked tapioca flour) all made cookies with an unacceptable coarse and dry texture. Pre-gelatinized rice and tapioca flours produced gummy, tough cookies with hard surfaces. Doughs prepared with instant pudding mix (modified corn starch) were thin (low viscosity), while the cookies had a gummy, tough, and excessively chewy texture. Doughs made with pre-gelatinized potato starch (i.e., not potato flour) that was mixed to an optimum viscosity were very unstable, thickened upon standing, and produced thick, dense, hard, and gummy cookies.

In contrast, wheat doughs prepared as above, with even a low level (10.5%) of potato flour had a low viscosity, but the cookies were dry and coarse, not gummy. While these preliminary results were encouraging, the doughs formulated with such low levels of potato flour had a low viscosity and 'spread' excessively (i.e., in diameter) during baking, while doughs formulated with a higher content (62%) of potato flour, although having an acceptable viscosity, did not 'spread' sufficiently, resulting in dry, finely textured cake-like cookies with a crumb grain. An 'optimal' mix of potato flour (21%) with wheat flour produced a dough that was thick and viscous, and produced tender moist cookies (not gummy) and with an open coarse crumby grain.

EXAMPLE 3

Representative Formulation of a Hydrocolloid Fat Substitute Bakery Dough

By empirical testing, exemplary preferred hydrocolloid fat substitute cookie doughs were formulated using for the wheat flour either: (a) a low extraction, short patent cake cut flour (approximately 50–55% extraction) milled from soft white wheat and having 7.0–8.0% flour protein and <0.40% ash; or (b) pastry flour obtained from Pendleton Flour Mills, Pendleton, Oreg., and using potato starch as the 'fat substitute'; non-fat dry milk solids as the 'water absorbing dough binder'; whole egg as the 'binder'; baking soda as the 'leavening agent'; brown sugar, butter flavoring, butter powder, vanilla as 'flavoring additives'; and corn syrup as a 'fat-like additive'.

TABLE 2

| Component | Amount[a] (unit) | Weight (gm) | (% w/w flour)[b] | (% w/w flour)[c] | Composition (range % w/w flour)[b] |
|---|---|---|---|---|---|
| Wheat flour | 1½ Cup | 180[b] | 100% | | NA |
| | | 246[c] | | 100% | |
| Particulate starchy flour | | | | | |
| Potato flour | ¼ Cup | 37.5[b] | 21 | | 10.5–62 |
| | | 39[c] | | 16 | 8–45 |
| Water absorbing dough binder | | | | | |
| Non-fat dry milk solids Binder | 2 tb | 11.65 | 6 | 5 | 1.5–12 1.1–9 |

TABLE 2-continued

| Component | Amount[a] (unit) | Weight (gm) | (% w/w flour)[b] | (% w/w flour)[c] | Composition (range % w/w flour)[b] |
|---|---|---|---|---|---|
| Egg | 1 egg | 53 | 29 | 22 | 7-60 |
| Leavening Agent | | | | | |
| Baking soda | ¾ tsp | 4 | 2 | 1.6 | 0.5-5 |
| Additives | | | | | |
| Brown sugar | ¾ Cup | 150[b] | 83 | | 21-139 |
| | | 162[c] | | 66 | |
| Vinegar | ½ tsp | 2.38 | 1 | 1 | 0.25-2.0 |
| Corn syrup | 45 ml | 56[b] | 31 | | 15-93 |
| | | 67[c] | | 27 | 11-68 |
| Molasses | 1 tb | 17 g | 9 | 7 | 0-20 |
| Vanilla extract | 1 tb | 14.25 | 8 | 6 | TT |
| Butter flavoring | 1 tsp | 4.75 | 3 | 2 | 1.5-6 |
| Butter powder | 1 tsp | 2.7 | 1.5 | 1.1 | 1-20 |
| Water | 2 tb | 25.5 | 14 | 10 | 7-28 |

[a]Units of measure: cup, baking measure; tb, tablespoon; tps, teaspoon; ml, milliliter; and gm, gram; NA, not applicable; TT, to taste
[b]wheat flour was pastry flour, % w/w flour expressed as the % weight of component/weight of pastry flour.
[c]wheat flour was cake flour, % w/w flour expressed as the % weight of component/weight of cake flour.

The compositions in Table 2 were used to formulate hydrocolloid fat substitute cookie doughs that were mixed for approximately 1.5 to 20 minutes into a batter that had optimal viscosity, portions of the batter were placed on a cookie tray, and baked in an oven at 375°-400° F. until brown. The cookies were tender, moist, and chewy with a relatively high moisture content of approximately 10.7%, and free water activity values of 0.550, with a desirable brown color, good flavor and a coarse crumb grain structure that was not cake like. The above formulations of Table 2 produces about 30 cookies of the type commonly referred to as "snickerdoodle" cookies.

EXAMPLE 4

Tests of Wheat Flours

Tests were conducted in which fat substitute bakery doughs were prepared as in Example 3, but in which different types of wheat flours were used. A low extraction, short patent cake cut flour (approximately 50-55% extraction) milled from soft white wheat, 7.0-8.0% flour protein and <0.40% ash, produced cookies with optimal flavor (i.e., animal cracker-like), spread (i.e., diameter on baking), browning, crumb grain, and texture.

Chlorinated extra short patent cake flour produced higher viscosity doughs, but when baked these doughs produced cookies that were denser, thicker, and had a somewhat cake-like crumb grain, as compared to the low extraction, short patent cake cut flour. Long patent (approximately 68% extraction) pastry flour, 9.0-9.5% protein and 0.45% ash (Pendleton Flour Mills, Pendleton, Oreg.), also produced higher viscosity doughs and acceptable cookies, but the cookies were more 'grainy' with somewhat of an off-flavor, reduced spread, and somewhat cake-like but gummy crumb, as compared to the low extraction, short patent cake cut flour.

All purpose flour, a blend of low and high protein hard red wheat flours (straight-grade extraction), and whole wheat flour were both found less desirable for use in hydrocolloid fat substitute cookie doughs because of their excessive water absorption capacity and high dough/gluten strength. The whole wheat flour also produced cookies with an increased tendency to become rancid over time in storage.

Although not tested, low extraction, low protein soft red wheat flours are also considered less desirable for a hydrocolloid fat substitute cookie dough because they contain a high level of bitter flavored components.

EXAMPLE 5

Figure 1A:
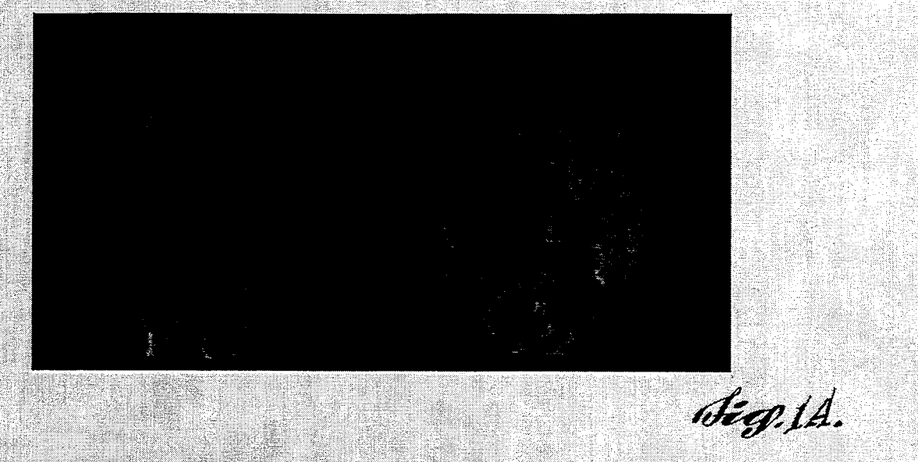
FIGS. 1A through 1C show photographs of cross-sectioned cookies prepared in accordance with a preferred embodiment of the present invention, wherein the water content, as a percent of the weight of wheat flour, was varied as follows: 10% (FIG. 1A); 20% (FIGURE 1B); and 40% (FIG. 1C), the dough containing a mixture of potato flour and nonfat dry milk, combined in a ratio of 3.2 to 1, comprising 65 % of the weight of wheat flour.
Figure 1B:
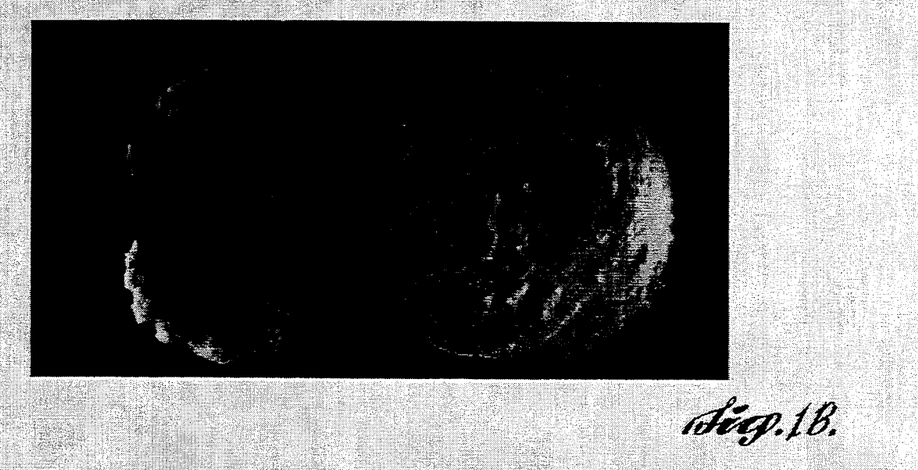
Figure 1C:
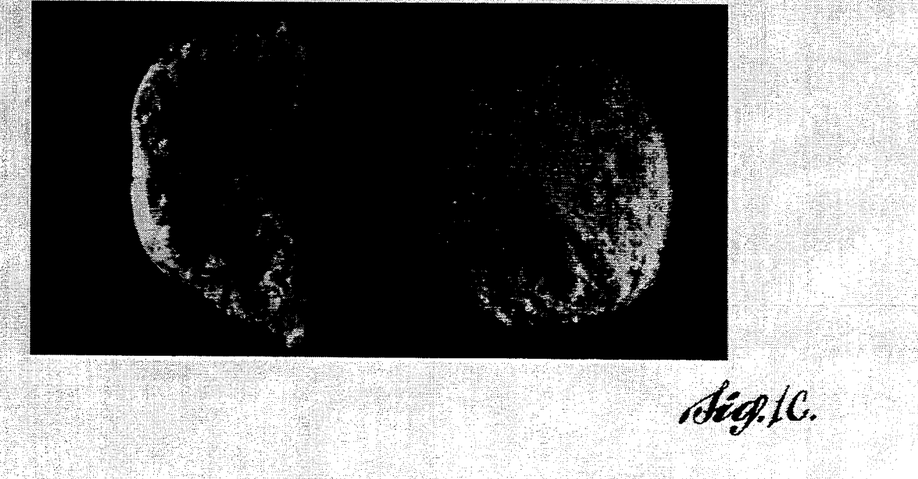
Figure 2A:
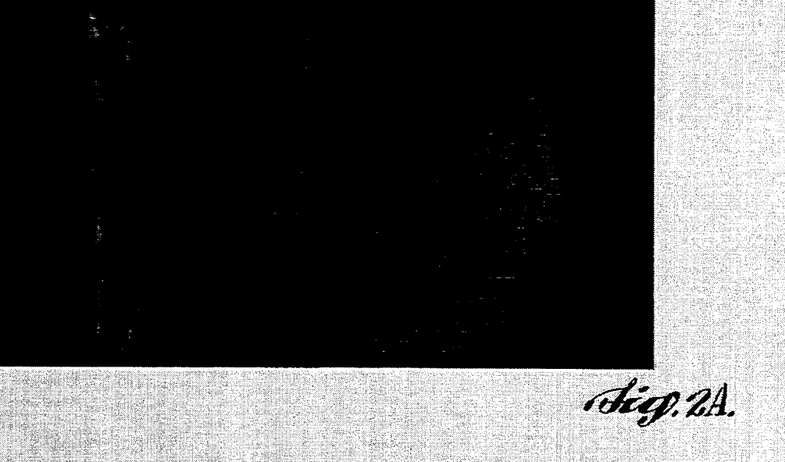
FIGS. 2A through 2F show photographs of cross-sectioned cookies prepared in accordance with a preferred embodiment of the present invention, using a basis of 128.5 gm of wheat flour, and with the weight of non-fat dry milk solids ("NFDMS") in the dough was varied between low (2.14 gm), medium (11.65 gm); and high (34.87 gm) levels, and the weight of potato flour was varied between low (21.4 gm), medium (37.5 gm) and high (83 gm) levels, with the photographs corresponding to: low potato flour, low NFDMS (FIG. 2A); medium potato flour, low NFDMS (FIG. 2B); high potato flour, low NFDMS (FIG. 2C); low potato flour, high NFDMS (FIG. 2D); medium potato flour, high NFDMS (FIG. 2E); and high potato flour, high NFDMS (FIG. 2F).
Figure 2B:
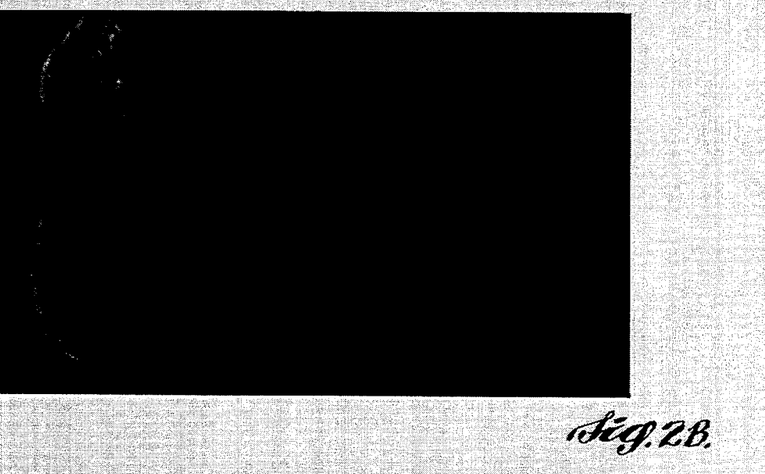
Figure 2C:
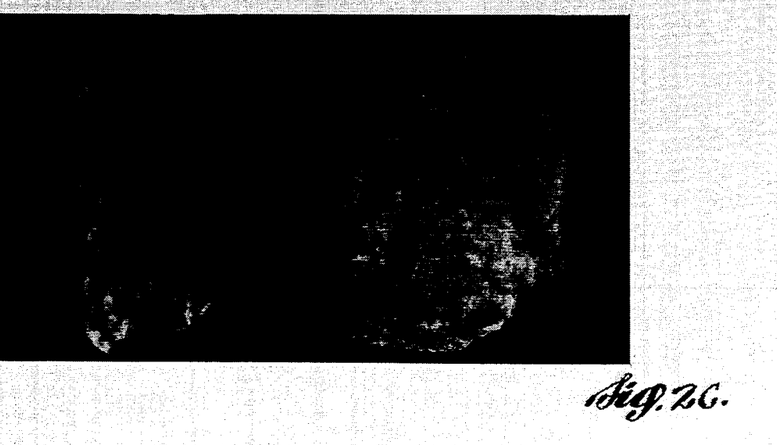
Figure 2D:
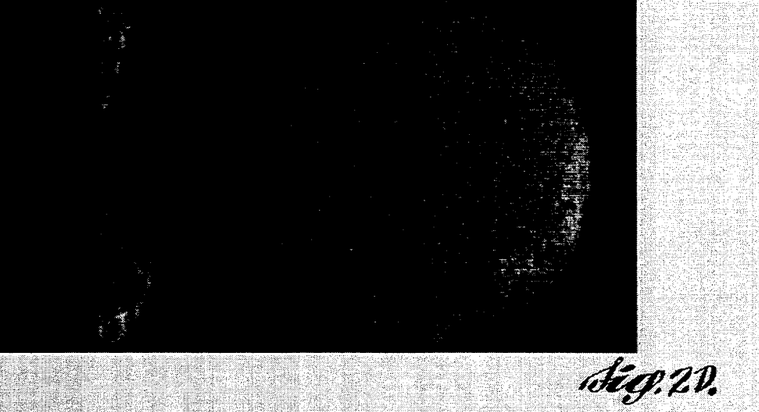
Figure 2E:
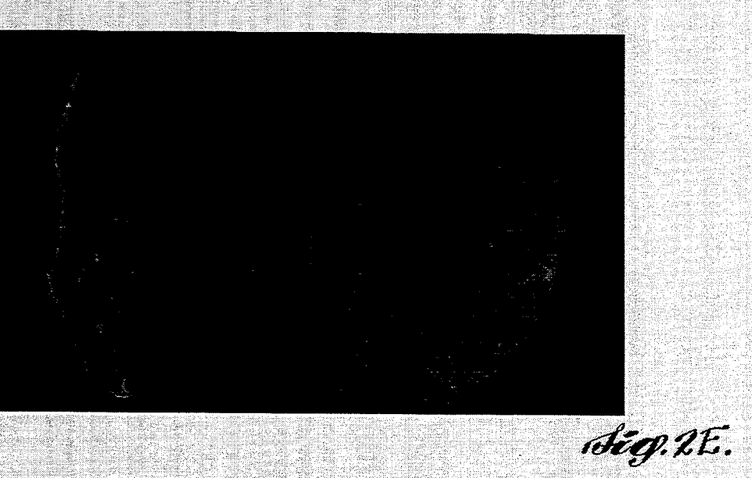
Figure 2F:
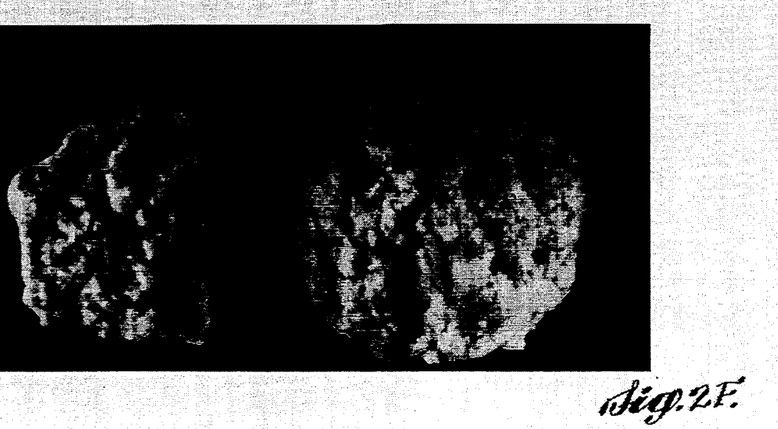

Effects of Water Volume on Properties of a Hydrocolloid Fat Substitute Baking Product In this experiment the effects of water on a hydrocolloid fat substitute bakery dough were investigated. The formulation, dough preparation, and baking methods, detailed above in Example 3 were followed, using 128.5 gm of pastry wheat flour obtained from Pendleton Flour Mills, Pendleton Oreg. as the basis of the formulation, and water content was varied. A mixture of potato flour and non-fat dry milk, combined in a ratio of 3.2 to 1, was added in a quantity comprising 65 % of the wheat flour. The photographs presented in FIG. 1A through 1C show chocolate chip cookies prepared at 10% water (FIG. 1A), 20% water (FIG. 1B); 40% water (FIG. 1C); wherein all percentages are weight percent of the wheat flour. As a very high quantity of potato flour was added in this experiment, all cookies shown is FIGS. 1A through 1C exhibited poor spread and gummy interiors. Further experiments were done wherein the mixture of potato flour and non-fat dry milk, combined in a ratio of 3.2 to 1, comprised 40% of the weight of wheat flour. These experiments indicated that as the percentage weight of water in the hydrocolloid fat substitute cookie dough was increased, the spreading of the cookies increased, cookies became thinner, the cookie became dryer (due to increased spread), and the crumb texture became progressively more coarse.

EXAMPLE 6

Effects of Changing the Ratio of Potato Flour and Water Absorbing Dough Binder

The effects of changing the amounts and ratios of the potato flour and water absorbing dough binder (i.e., nonfat dry milk solids; hereinafter "NFDMS") was next investigated by formulating cookies according to the methods and formulations in Example 3, except potato flour and NFDMS content was varied, and a basis of 128.5 gm of pastry wheat flour obtained from Pendleton Flour Mills, Pendleton Oreg. was used. Dough batches were formulated at: low levels of NFDMS, containing 2.14 gm of NFDMS; medium levels of NFDMS, containing 11.65 gms of NFDMS; and high levels of NFDMS, containing 34.87 gms NFDMS.

The potato flour of the dough batches was also varied. Dough batches were formulated at: low levels of potato flour, containing 21.4 gms potato flour; medium levels of potato flour, containing 37.5 gms potato flour; and high levels of potato flour, containing 83 gms potato flour.

The results of these studies are presented in Table 3 and FIGS. 2A through 2F. The ratio of potato flour to NFDMS was found to be a critical determinant of the properties of the baked product. For this experiment, medium levels of potato flour and NFDMS were found to e optimal, corresponding to a potato flour/NFDMS weight ratio of 3.2.

TABLE 3

| Potato Flour[a] | NFDMS[b] | FIG. | Dough Properties | Cookie Properties | | | | |
|---|---|---|---|---|---|---|---|---|
| | | | | Spread | Texture | Surface | Interior | Ratio[c] |
| Low | Low | 2A | Low Viscosity, off flavor | Large | Coarse | — | Chewy/tender | 10.0 |
| Medium | Low | 2B | Soft | Medium | Fine grain Cake-like | — | Gummy/tender | 17.5 |
| High | Low | 2C | Stiff | Low | Fine grain Cake-like | Hard | Gummy-Medium/tender | 38.8 |
| Low | High | 2D | Soft | Large | Medium grain | — | Dry | 0.6 |
| Medium | High | 2E | Soft | — | Fine grain Cake-like | Hard | — | 1.1 |
| High | High | 2F | Tough | Lowest | Fine grain | — | Gummy | 2.4 |

[a]Potato flour = low (21.4 gm); medium (37.5 gm); and high (83 gm).
[b]NFDMS, Non-fat dry milk solids = low (2.14 gm); medium (11.65 gm); and high (34.87 gm)
[c]Ratio = (weight of Potato Flour)/(weight of NFDMS)

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fat substituted shortened type baked cookie made from a dough comprising:
   wheat flour;
   greater than 8 to less than 62 percent potato flour, all percentages being based on the weight of the wheat flour, as a substitute for fat that would otherwise be present in the shortened type baked cookie, whereby the baked cookie contains from zero to 10 percent fat;
   greater than 1.1 to less than 12 percent of a water absorbing binder comprising a protein source high in calcium and phosphate, wherein the weight ratio of potato flour to water absorbing binder is from 0.9 to 41.3;
   greater than 7 to less than 60 percent of a binder source selected from the group consisting of eggs, egg components, and egg substitutes;
   greater than 11 to less than 93 percent of a fat-like sensory additive comprising an invert-sugar source;
   a leavening agent; and
   greater than 7 to less than 28 percent of a liquid whereby the baked cookie contains from zero to 15 percent water and has an open crumb grain structure.

2. The cookie of claim 1, wherein the total fat content of the cookie is less than 5 percent, based on the weight of the wheat flour.

3. The cookie of claim 1, wherein the water absorbing binder comprises non-fat dry milk solids.

4. The cookie of claim 3, wherein the weight ratio of potato flour to non-fat dry milk solids is from 1.0 to 10.0.

5. The cookie of claim 4, wherein the weight ratio of potato flour to non-fat dry milk solids is from 2.0 to 5.0.

6. The cookie of claim 1, wherein the potato flour comprises from 10 to 25 percent of the cookie, based on the weight of the wheat flour.

7. The cookie of claim 1, further comprising a rolled grain, wherein the potato flour comprises from greater than 8 to less than 62 percent of the cookie, based on the combined weight of the wheat flour and the rolled grain.

8. The cookie of claim 1, wherein the fat-like sensory additive comprises from 20 to 40 percent of the cookie based on the weight of the wheat flour.

9. The cookie of claim 1, wherein the binder source comprises from 20 to 40 percent of the cookie, based on the weight of the wheat flour.

10. The cookie of claim 1, further comprising a flavor additive selected from the group consisting of brown sugar, vanilla extract, butter flavoring, butter powder and mixtures thereof.

11. The cookie of claim 1, wherein the wheat flour comprises a short patent cake cut flour milled from soft white wheat.

12. A fat substitute shortened type baked cookie comprising wheat flour, binding agents including a water absorbing binder that is a protein source high in calcium and phosphate, a leavening agent, other non-fat ingredients, and fat ingredients, wherein at least 75 percent by weight of the fat ingredients are replaced with potato flour as a fat substitute, whereby the baked cookie has a total fat content of from zero to 10 percent, based on the weight of the wheat flour, the potato flour is included at a level from greater than 8 to less than 62 percent, based on the weight of the wheat flour, the weight ratio of potato flour to water absorbing binder is from 0.9 to 41.3, and the baked cookie contains from zero to 15 percent water based on the weight of the wheat flour.

13. The cookie of claim 12, wherein the water absorbing binder comprises non-fat dry milk solids.

14. The cookie of claim 12, wherein the potato flour comprises at least 10 percent of the cookie, based on the weight of the wheat flour.

15. A process for preparing a fat substituted bakery dough for use in baking shortened type bakery products, comprising mixing:
   a wheat flour;
   from greater than 8 to less than 62 percent of potato flour as a substitute for the fat that would otherwise be present in the shortened bakery dough, for a total fat content of from zero to 10 percent;

from greater than 1.1 to less than 12 percent of a water absorbing dough binder high in calcium and phosphate, wherein the weight ratio of potato flour to water absorbing dough binder is from 0.9 to 41.3;

from greater than 7 to less than 60 percent of a binder source selected from the group consisting of eggs, egg components, and egg substitutes;

from greater than 11 to less than 93 percent of a fat-like sensory additive comprising an invert-sugar source; and a leavening agent, wherein all percents are based on the weight of the wheat flour, whereby a fat substituted shortened type bakery product from the mixed dough has a reduced total fat content of from zero to 10 percent and an open crumb grain structure.

16. The process of claim 15, further comprising baking the dough to produce a moist, tender cookie containing from zero to 15 percent water.

17. A fat substituted shortened type baked cookie comprising wheat flour, binding agents, a leavening agent, other non-fat ingredients, and at least 30 percent fat ingredients, based on the weight of the wheat flour, wherein the improvement comprises at least 75 percent by weight of the fat ingredients being replaced with potato flour as a fat substitute and wherein the binding agents comprise a water absorbing dough binder and the ratio and potato prior to water absorbing dough binder is from 0.9 to 41.3.

18. The cookie of claim 17, wherein the potato flour is included at a level of from greater than 8 to less than 62 percent, based on the weight of the wheat flour.

* * * * *

UNITED STATES PATENT AND TRADEMARK OFFICE
CERTIFICATE OF CORRECTION

PATENT NO. : 5,344,663
DATED : September 6, 1994
INVENTOR(S) : A. M. Jewell, et. al.

It is certified that error appears in the above-indentified patent and that said Letters Patent is hereby corrected as shown below:

Title page, item [54], and col. 1, line 2, in the Title, "FAT-SUBSTITUTE" should read --FAT SUBSTITUTE--
Title page, item [56], under Refs. Cited "Held" should read -held--
　　　　　　　　　　　　　　　　Refs. Cited "Porato" should read --Potato--
　　　　　　　　　　　　　　　　Refs. Cited insert --R.H. Treadway, Potato Flour and Its Use in the Baking Industry, "The Bakers Digest, August 1949, pp. 82-84 plus cover sheet--.
Column 1, line 55, "Clicksman" should read --Glicksman--
Column 2, line 14, "Decature" should read --Decatur--
Column 2, line 15, "Ill." should read --IL--
Column 4, line 23, "65 %"should read --65%--
　　　　　4, line 58, "a desirable the desired" should read --the desired--.
　　　　　4, line 68, "25 %"shoulf read --25%--.
Column 5, line "15 %"should read --15%--.
Column 5, line 2, "5 %" should read --5%--.
Column 5, line 29, "walls" should read --wall--.

UNITED STATES PATENT AND TRADEMARK OFFICE
CERTIFICATE OF CORRECTION

PATENT NO. : 5,344,663

DATED : September 6, 1994

INVENTOR(S) : A.M. Jewell et al.

It is certified that error appears in the above-indentified patent and that said Letters Patent is hereby corrected as shown below:

| COLUMN | LINE | |
|---|---|---|
| 5 | 54 | "to a mean" should read --to mean a-- |
| 6 | 52 | "15 %" should read --15%-- |
| 6 | 63-64 | "hydralion" should read --hydration-- |
| 9 | 25 | "is desirable" should read --it is desirable-- |
| 9 | 43 | "The" should read --*The*-- |
| 13 | 62 | "7 %" should read --7%-- |
| 14 | 36 | "a the" should read --the-- |
| 14 | 54 | "Ill" should read --In-- |
| 16 | 5 | "is" should read --in-- |
| 16 | 9 | "rages" should read --ranges-- |
| 17 | 3 | "preferreel" should read --preferred-- |
| 17 | 52 | "coo-Ides" should read --cookies-- |
| 20 | 36 | "65 %" should read --65%-- |
| 20 | 43 | "is FIGURES" should read --in FIGURES-- |

UNITED STATES PATENT AND TRADEMARK OFFICE
CERTIFICATE OF CORRECTION

PATENT NO. : 5,344,663
DATED : September 6, 1994
INVENTOR(S) : A. M. Jewell, et. al.

It is certified that error appears in the above-indentified patent and that said Letters Patent is hereby corrected as shown below:

Column 21, line 14, "to e" should read --to be--.

Signed and Sealed this

Twenty-fourth Day of January, 1995

Attest:

BRUCE LEHMAN

Attesting Officer    Commissioner of Patents and Trademarks